United States Patent [19]

Jobmann et al.

[11] Patent Number: 4,786,098
[45] Date of Patent: Nov. 22, 1988

[54] BRAKE MECHANISM FOR THE OPENING MOVEMENT OF LIDS AND COVERS

[75] Inventors: Ingo Jobmann, Grafenau; Ulrich Bruhnke, Ehningen; Helmut Fischer, Böblingen; Santiago Duenas, Rottweil; Hans Trube, Herrenberg, all of Fed. Rep. of Germany

[73] Assignee: Daimler-Benz Aktiengesellschaft, Fed. Rep. of Germany

[21] Appl. No.: 87,795

[22] Filed: Aug. 21, 1987

[30] Foreign Application Priority Data

Aug. 22, 1986 [DE] Fed. Rep. of Germany ....... 3628555

[51] Int. Cl.⁴ .............................................. B60R 7/06
[52] U.S. Cl. .................................. 296/37.12; 312/248
[58] Field of Search ............................ 296/37.12, 37.8; 312/248, 242, 326, 327, 328; 108/45; 224/282

[56] References Cited

U.S. PATENT DOCUMENTS

| 2,883,234 | 4/1959 | Biondo | 296/37.12 |
| 4,239,277 | 12/1980 | Oda | 296/37.12 |
| 4,596,416 | 6/1986 | Müller | 296/37.12 |
| 4,630,857 | 12/1986 | Zweiniger et al. | 296/37.12 |

FOREIGN PATENT DOCUMENTS 3431362 3/1986 Fed. Rep. of Germany .

Primary Examiner—Robert R. Song
Attorney, Agent, or Firm—Barnes & Thornburg

[57] ABSTRACT

For obtaining a damped movement into the opened position in a glove compartment lid in a motor vehicle, a piston-cylinder unit constructed as brake is provided whose piston rod is operatively connected with a retaining member pivotally connected at the glove compartment lid. The air compressed during the opening operation by the piston leaves through a calibrated opening into the free atmosphere.

11 Claims, 1 Drawing Sheet

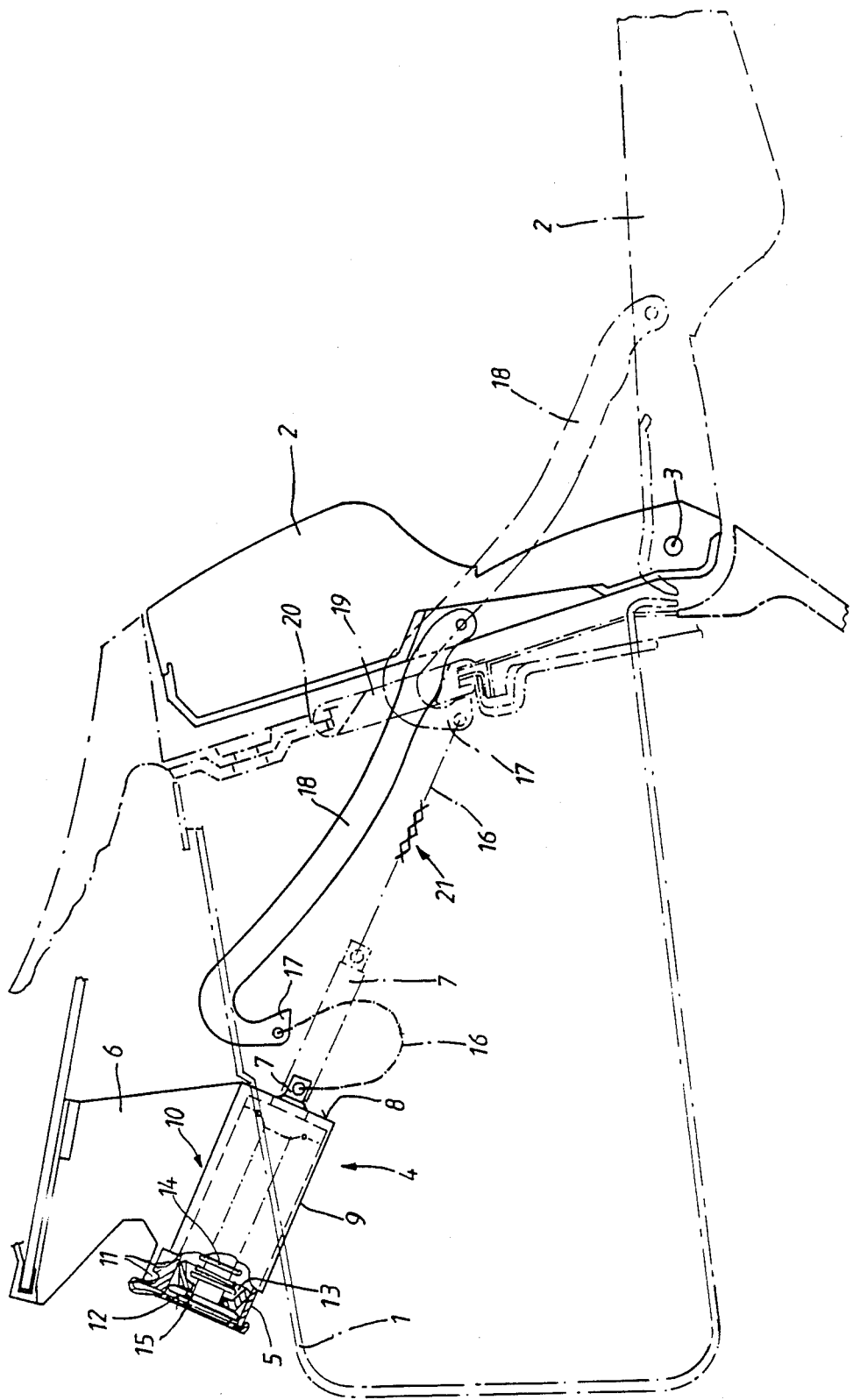

BRAKE MECHANISM FOR THE OPENING MOVEMENT OF LIDS AND COVERS

BACKGROUND AND SUMMARY OF THE INVENTION

The present invention relates to a brake mechanism for the opening movement of lids and covers, such as a glove compartment lid in a motor vehicle, whereby a brake cooperating with a locally fixed part is brought into operative connection with the free end of a retaining part operatively connected with the lid prior to reaching the open position of the lid.

Such a brake mechanism operating on magnetic basis is disclosed in the DE-OS No. 34 31 362. It is thereby proposed for adapting the damping action to change the distance between the magnet and the ferromagnetic layer, to vary the quantity in ferromagnetic material or to change the friction coefficient of a plastic layer applied between the ferromagnetic material and the magnet. The provided adaptation measures involve a time-consuming adjustment, a costly construction and therebeyond require lengthy tests whereby the initially reached friction coefficient is so changed by noncontrollable influences, for example, by dust deposits that the function can be jeopardized.

It is the object of the present invention to provide a brake mechanism which, following its installation, requires no further adjusting work and whose braking action is not subjected to any change during the operation.

The underlying problems are solved according to the present invention in that a band is inserted between the end of the piston rod and the free end of the retaining part, which during the opening operation is initially converted into its stretched position, and in that only prior to reaching the open position the piston is displaced against the force of a spring.

Tolerances are compensated in a simple manner if a band is inserted between the end of the piston rod and the free end of the retaining part.

The band may thereby consist of spring-elastic material initially assisting the opening operation.

Advantages as regards its own weight and adaptation to different lid weights in relation to different vehicle types exist when the band consists of plastic material and is perforated in the manner of an elastically elongatable configuration of recurring, interconnected and at least approximately diamond-like elements.

If the piston cylinder unit becomes operable only when the working or deformation capacity of the series-connected band operating in the elastic range is exhausted, then a smoothly rising damping curve can be achieved.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

The single FIGURE is a somewhat schematic cross-sectional view through one embodiment of a brake mechanism in accordance with the present invention.

DETAILED DESCRIPTION OF THE DRAWING

Referring now to the single figure of the drawing, a glove compartment 1 indicated in its contour lines in a motor vehicle, not illustrated in detail, is provided with a glove compartment lid 2 which is adapted to be transferred from a closed position into its open position about a shaft 3 located in its bottom area.

In order that the glove compartment lid 2 does not stop hard when reaching its open position and possibly springs back, a brake generally designated by reference numeral 4 in the form of a piston-cylinder unit 5 is provided. This brake 4 is received by a locally fixed part 6 in the form of a bracket whereby the piston rod 7 of the piston-cylinder unit 5 passes through the bottom 8 of the mounting means generally designated by reference numeral 10 of the locally fixed part 6 which is constructed as a tubular member 9 slotted in the downward direction, and a safety against displacement is attained by a detent device 11.

An outlet with accurate dimensions which is indicated in the drawing is located in the piston bottom 12 of the piston 13 which is displaceable against the force of a spring 14. The compressed air which occurs during a piston displacement escapes through the outlet 15 into the free atmosphere. The displacement movement is brought about in that the piston rod 7 is operatively connected under interposition of a band 16 consisting of spring-elastic material with the free end 17 of a retaining part 18 engaging at the glove compartment lid 2 and in that during the downward pivoting movement of the glove compartment lid 2 the force of the spring 14 is overcome after using up the elastic deformation path of the band 16. The retaining part 18 passes through a lined opening 19 in a forward wall area 20 adjoining the glove compartment 1 and the free end 17 of the retaining part 18 limits the downwardly directed pivot movement of the glove compartment lid 2.

In the closed position of the glove compartment lid 2 the band 16 consisting of plastic material forms a loop which in its unstressed condition tends to open into a flat, stretched out, straight length, but which can be coiled in a loop by retaining part 18 moving one end of the band adjacent to its connection to piston rod 7. In this manner, when the band is coiled in a loop it has a natural tendency to uncoil in a flat, straight length, thus applying a force to the end 17 of retaining part 18 tending to cause it to open lid 2 and thus the pivot movement is assisted during the opening movement. The center area 21 of the band 16 is illustrated in the drawing rotated through 90° so that the construction in the form of an elastically elongatable configuration of recurring, interconnected and at least approximately diamond-like elements can be seen.

While we have shown and described only one embodiment in accordance with the present invention, it is understood that the same is not limited thereto but is susceptible of numerous changes and modifications as known to those skilled in the art and we therefore do not wish to he limited to the details shown and described herein but intend to cover all such changes and modifications as are encompassed by the scope of the appended claims.

We claim:

1. A brake arrangement for limiting the movement of a pivotal member such as a cover or a lid from a closed to an open position; said pivotal member having a pivot axis located in the lower area thereof; comprising a piston-cylinder unit having a throttled outlet and a piston rod, a guided retention member pivotally connected with the pivotal member, and a band means operatively connecting an end of the piston rod and a free end of the retention member; the band means during an opening operation, being at first transferred into a stretched position; and the piston being displaced against the force of a spring only just prior to the pivotal member reaching the open position.

2. A brake arrangement according to claim 1, wherein the pivotal member is a lid of a glove compartment of a motor vehicle.

3. A brake arrangement according to claim 1, wherein the band means consists of spring-elastic material originally assisting the opening movement of the pivotal member operation.

4. A brake arrangement according to claim 3, wherein the band means consists of plastic material and is provided with an elastically deformable aperture-like configuration.

5. A brake arrangement according to claim 4, wherein the band means is in the shape of interconnected securing elements of at least approximately diamond-like contour.

6. A brake arrangement according to claim 4, wherein the piston-cylinder unit become operatable to limit opening only when the working capability of the series-connected band means operating in the elastic range is exhausted.

7. A brake arrangement according to claim 6, wherein the pivotal member is a lid of a glove compartment of a motor vehicle.

8. A brake arrangement according to claim 1, wherein the band means consists of plastic material and is provided with an elastically deformable aperture-like configuration.

9. A brake arrangement according to claim 8, wherein the band means is in the shape of interconnected securing elements of at least approximately diamond-like contour.

10. A brake arrangement according to claim 1, wherein the piston-cylinder unit becomes operable to limit opening only when the working capability of the series-connected band means operating in the elastic range is exhausted.

11. A brake arrangement according to claim 10, wherein the pivotal member is a lid of a glove compartment of a motor vehicle.

* * * * *